Sept. 30, 1952 B. STAHMER 2,612,453
POTATO CHIP CONSTRUCTION
Filed May 23, 1949
Fig. 1
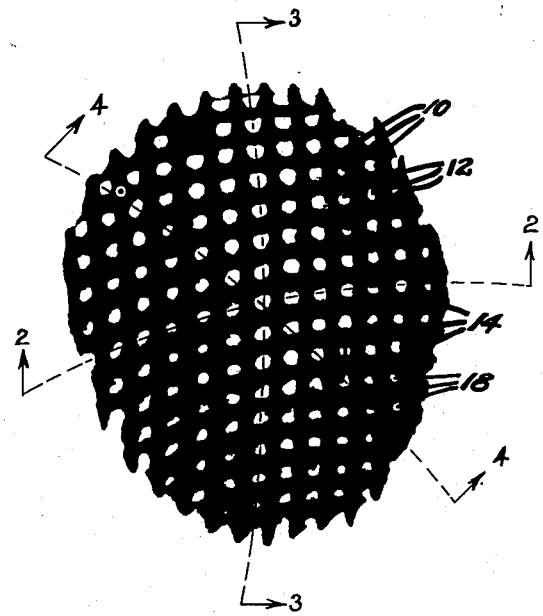
Fig. 2
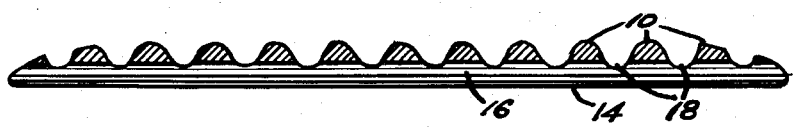
Fig. 3
Fig. 4
Inventor
Bernhardt Stahmer
By Arthur H. Sturges
Attorney Patented Sept. 30, 1952

2,612,453

UNITED STATES PATENT OFFICE 2,612,453

POTATO CHIP CONSTRUCTION

Bernhardt Stahmer, Omaha, Nebr.

Application May 23, 1949, Serial No. 94,911

2 Claims. (Cl. 99—100)

This invention relates to the manufacture of potato chips and more particularly is it an object of this invention to provide a potato chip of greater novelty, edibility, and strength than heretofore.

In the prior art, potato chips have been made having alternate ridges and furrows disposed in parallelism on two sides of the chips.

Potato chips of the type described are usually formed by a machine in which at least two cutters move across a potato from opposite sides thereof, the swaths intersecting each other at certain angles in accordance with the type of potato chip being made and in accordance with the construction of the slicing machine used.

Potato chips of the prior art have had a disadvantage in that they lend themselves only to manufacturing motions in which the cutting swaths intersect at the center of the potato in substantial parallelism with respect to each other. Such chips and methods cause the waste of the small diametered ends of a potato which are chewed up by the blades. Such chips and methods also cause a weak point at the center of a chip of larger diameter formed from the middle of a potato.

It is therefore an object of this invention to provide a chip having alternate ridges and furrows on both sides of the chip, and a chip which additionally has sufficient strength to avoid breakage during packaging, handling, and delivery of the chips from the manufacturer to the consumer.

A particular object of the invention is to provide a potato chip as described in which the concave sides of ridges on opposite sides of a chip face in opposite directions so as to provide the chips with greater strength than is possible when the ridges face in similar directions.

Another object of the invention is to provide a potato chip as described having perforations where the furrows of one side intersect the furrows of the opposite side, the perforations being irregular but substantially round, rather than oblong, whereby the potato chip is not unduly weakened by its perforations.

A further object of the invention resides in the provision of the ribs or ridges on opposite sides of a chip being disposed intersecting each other at more nearly a right angle than heretofore for increasing the strength of the chip.

Yet a further object of the invention is to provide a potato chip which is adapted to be manufactured by a cutting machine constructed so that the swath of the cuts, made from two sides of the potato, are at all times transversely disposed with respect to each other for avoiding the waste of the small diametered ends of the potato and for avoiding the formation of weak points at the centers of those chips formed from the larger diametered center portion of a potato.

A further object of the invention resides in the provision of a potato chip of more uniform maximum thickness at all raised points thereof.

Yet another object of the invention is to provide a potato chip of more sales appeal than heretofore.

A further object of the invention is to provide a potato chip such as can be made by the machine described in the applicant's prior patent application titled "Eccentric Knife Potato Slicer," Serial Number 35,611, filed June 28, 1948.

A still further object of the invention is to provide a potato chip having perforations so shaped that cooking oil can flow freely therethrough for more efficient, thorough and rapid cooking.

Other and still further objects and advantages of the invention will become apparent from the following detailed description of a preferred embodiment thereof.

In the drawings:

Figure 1 is a photographic, semi-diagrammatic top plan view of the potato chip of this invention shown after it has been cooked and is ready for eating.

Figure 2 is a view-in-section taken along the line 2—2 of Figure 1, the chip in Figure 2 being substantially flat as it is previous to cooking.

Figure 3 is a view-in-section taken along the line 3—3 of Figure 1, and prior to cooking.

Figure 4 is a view-in-section taken along the line 4—4 of Figure 1, and prior to cooking.

The potato chip of this invention is provided with alternate, parallel, ridges 10 on one side thereof, spaced apart from each other by alternate parallel furrows 12. The ridges 10 and furrows 12 are disposed in parallelism and are arcuate in shape.

The opposite side of the chip is provided with alternate, parallel, ridges 14 which are spaced apart by alternate, parallel, furrows 16. The ridges 14 and furrows 16 are also arcuate in shape.

The furrows 16 preferably intersect with the furrows 12 at equidistantly spaced apart points, providing apertures 18 for providing the chip with a more novel and marketable appearance. The apertures 18 further permit cooking oil to pass between parts of the chip causing the chip to cook more rapidly, cooperating with the ridges to provide a thick but quickly cooked potato chip.

The furrows 12 and 16 are preferably provided with inclinedly disposed side walls, so that, as best seen in Figure 4, cooking oil can pass freely through the apertures 18 during cooking, providing a more efficiently, thoroughly, and quickly cooked chip than heretofore.

As best seen in Figure 4, the apertures 18 are thus provided with outwardly flaring sidewalls on two opposite sides thereof for permitting cooking oil to flow freely therethrough.

As is illustrated in the above described patent application, the potato chip of this invention is manufactured by a machine making cuts across the potato from two opposite directions in alternation. As a result the ridges and furrows are arcuate. It is desired, however, that the ridges 10 be disposed crossing the ridges 14 at nearly a right angle, as is possible for providing the chip with maximum strength.

Accordingly the furrows on one side of the chip of this invention intersect the furrows on the other side of the chip at substantially right angles as shown in Figure 1. More particularly the furrows on one side of the chip at no point or at no part thereof intersect the furrows on the other side of the chip at right angles.

As a result, the apertures 18 are each of more nearly a circular shape than would otherwise be possible. Apertures of more nearly circular shape are desired because elongated apertures disposed in alignment would cause the potato chip to be unduly weakened whereby it would crack and crumble in shipping and handling.

In other words the perforation or apertures 18 are preferably of substantially the same width in all directions. It will be of course seen that the perforations cannot be exactly circular in shape because of the arcuate arrangement of ridges and furrows and further because of the irregular disposition of cooking oil crust upon the chip, as shown in Figure 1.

It will also be seen that the ridges 10 on one side of the chip are disposed with their concave sides facing in an opposite direction from the direction faced by the concave sides of the ridges 14, thus increasing the strength of the chip. The ridges and furrows of one side of the chip are at all places disposed transversely with the respect of the ridges and furrows on the other side of the chip.

This invention has provided a potato chip of greater novelty, edibility, and strength, which can be manufactured with less waste than heretofore.

From the foregoing description it is thought to be obvious that a potato chip construction in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A potato chip having a plurality of alternate ridges and furrows extending across one face thereof in substantially parallel arcuate paths and having a plurality of alternate ridges and furrows extending across the other face thereof in substantially parallel arcuate paths, said ridges each having divergingly disposed side walls terminating in a widened base, the furrows on opposite faces of said chip laterally intersecting each other for providing the chip with spaced perforations, said spaced perforations appearing in the bottom of said intersecting furrows between said bases and defining arcuate intersecting rows across the faces of said chip, thereby avoiding straight rows of spaced perforations which would tend to structurally weaken the chip.

2. A potato chip having a plurality of alternate ridges and furrows extending across one face thereof in substantially parallel arcuate paths and having a plurality of alternate ridges and furrows extending across the other face thereof in substantially parallel arcuate paths, said ridges each having divergingly disposed side walls terminating in a widened base, the furrows on opposite faces of said chip laterally intersecting each other for providing the chip with spaced perforations, said spaced perforations appearing in the bottom of said intersecting furrows between said bases and defining arcuate intersecting rows across the faces of said chip, thereby avoiding straight rows of spaced perforations which would tend to structurally weaken the chip, said perforations each being substantially circular in shape.

BERNHARDT STAHMER.

REFERENCES CITED

The following references are of record in the file of this patent:

UNITED STATES PATENTS

| Number | Name | Date |
| --- | --- | --- |
| 678,514 | Regnier | July 16, 1901 |
| 1,676,160 | Ruffner | July 3, 1928 |